US012278029B2

(12) United States Patent
Setiawan et al.

(10) Patent No.: US 12,278,029 B2
(45) Date of Patent: Apr. 15, 2025

(54) HEAT DISSIPATING STRUCTURES

(71) Applicant: GLOBALFOUNDRIES Singapore Pte. Ltd., Singapore (SG)

(72) Inventors: Yudi Setiawan, Singapore (SG); Handoko Linewih, Singapore (SG); Siow Lee Chwa, Singapore (SG)

(73) Assignee: GLOBALFOUNDRIES Singapore Pte. Ltd, Singapore (SG)

( * ) Notice: Subject to any disclaimer, the term of this patent is extended or adjusted under 35 U.S.C. 154(b) by 0 days.

(21) Appl. No.: 17/554,337

(22) Filed: Dec. 17, 2021

(65) Prior Publication Data

US 2023/0197320 A1 Jun. 22, 2023

(51) Int. Cl.
*H01C 1/08* (2006.01)
*H01C 1/084* (2006.01)
*H01C 7/00* (2006.01)
*H01C 17/075* (2006.01)

(52) U.S. Cl.
CPC ............... *H01C 1/08* (2013.01); *H01C 1/084* (2013.01); *H01C 7/006* (2013.01); *H01C 17/075* (2013.01)

(58) Field of Classification Search
CPC .......... H01C 1/08; H01C 1/084; H01C 7/006; H01C 17/075
USPC .......................................................... 338/307
See application file for complete search history.

(56) References Cited

U.S. PATENT DOCUMENTS 6,818,966 B2 11/2004 Beach et al.
7,208,388 B2 4/2007 Beach et al.
7,403,094 B2 7/2008 Beach et al.
8,451,085 B1 * 5/2013 Tsai ........................ B32B 18/00 338/307
8,643,143 B2 2/2014 Lee
10,854,543 B2 * 12/2020 Takizawa .............. H01L 23/564
2008/0102584 A1 * 5/2008 Kerr .................... H01L 23/3677 438/584
2012/0146186 A1 * 6/2012 Lukaitis .................. H01L 28/24 257/536

OTHER PUBLICATIONS

Kwon et al., "Process Optimization of Integrated SiCr Thin-Film Resistor for High-Performance Analog Circuits", IEEE Transactions on Electron Devices, vol. 61, Issue 1, Jan. 2014, 7 pages.

* cited by examiner

*Primary Examiner* — Kyung S Lee
(74) *Attorney, Agent, or Firm* — Anthony Canale; Andrew M. Calderon; Calderon Safran & Wright P.C.

(57) ABSTRACT

The present disclosure relates to semiconductor structures and, more particularly, to heat dissipating structures and methods of manufacture. The structure includes: a thin film resistor within a back end of the line structure; and a heat dissipating structure below the thin film resistor, the heat dissipating structure includes a top plate with a slotted configuration and being within the back end of the line structure.

19 Claims, 4 Drawing Sheets

HEAT DISSIPATING STRUCTURES

BACKGROUND

The present disclosure relates to semiconductor structures and, more particularly, to heat dissipating structures and methods of manufacture.

Thermal design is an important consideration in semiconductor devices. An optimized thermal design of a device enables better power levels, topologies and applications. Thermal design typically includes the use of a heat sink to dissipate heat away from heat generating devices and/or structures.

SUMMARY

In an aspect of the disclosure, a structure comprises: a thin film resistor within a back end of the line structure; and a heat dissipating structure below the thin film resistor comprising a top plate with a slotted configuration, and within the back end of the line structure.

In an aspect of the disclosure, a structure comprises: a thin film resistor within insulator material; a heat dissipating plate separated from the thin film resistor by insulator material; and a plurality of heat dissipating via connections contacting the heat dissipating plate from a bottom surface, the plurality of heat dissipating via connections being in the insulator material.

In an aspect of the disclosure, a method comprises: forming a thin film resistor within a back end of the line structure; and forming a heat dissipating structure below the thin film resistor comprising a top plate with a slotted configuration, and within the back end of the line structure.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to heat dissipating structures and methods of manufacture. More specifically, the present disclosure relates to heat dissipating structures used with and to dissipate heat generated from thin film resistors. Advantageously, the heat dissipating structures provide a more efficient thermal dissipator while stabilizing a sheet resistance (Rsh) shift in the thin film resistors during high current operation (compared to conventional structures). The heat dissipating structures also eliminate a short risk through the use of a slotted design.

In more specific embodiments, the heat dissipating structures are provided under a thin film resistor for dissipating heat generated from the thin film resistor. In embodiments, the thin film resistor may be a SiCr thin film resistor, although other material compositions are contemplated herein to be used with the heat dissipating structures. The heat dissipating structures may include a slotted design in order to avoid shorting between the contacts of the thin film resistor and underlying metal structures of the heat dissipating structures. The heat dissipating structures may comprise one or more metal plates (e.g., layers) and a sea of via connections connecting to the plates. The metal plates and via connections may be formed in back-end-of-line (BEOL) processes of an integrated circuit (IC) chip, e.g., SiCr based thin film resistor in Copper (Cu) or Aluminum (Al) BEOL.

The heat dissipating structures of the present disclosure can be manufactured in a number of ways using a number of different tools. In general, though, the methodologies and tools are used to form structures with dimensions in the micrometer and nanometer scale. The methodologies, i.e., technologies, employed to manufacture the heat dissipating structures of the present disclosure have been adopted from integrated circuit (IC) technology. For example, the structures are built on wafers and are realized in films of material patterned by photolithographic processes on the top of a wafer. In particular, the fabrication of the heat dissipating structures uses three basic building blocks: (i) deposition of thin films of material on a substrate, (ii) applying a patterned mask on top of the films by photolithographic imaging, and (iii) etching the films selectively to the mask. In addition, precleaning processes may be used to clean etched surfaces of any contaminants, as is known in the art. Moreover, when necessary, rapid thermal anneal processes may be used to increase material utilization and compositional control due to minimal elements diffusion as is known in the art.

Figure 1A:
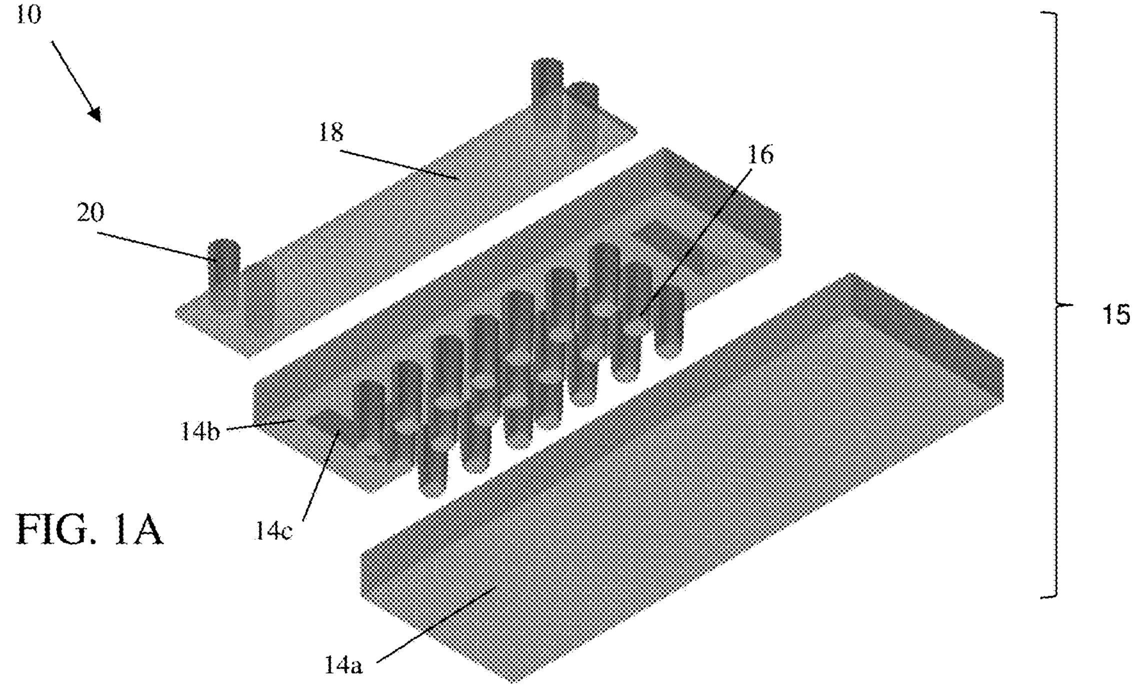
FIG. 1A shows an exploded 3-dimensional view of a heat dissipating structure, amongst other features, in accordance with aspects of the present disclosure.
Figure 1B:
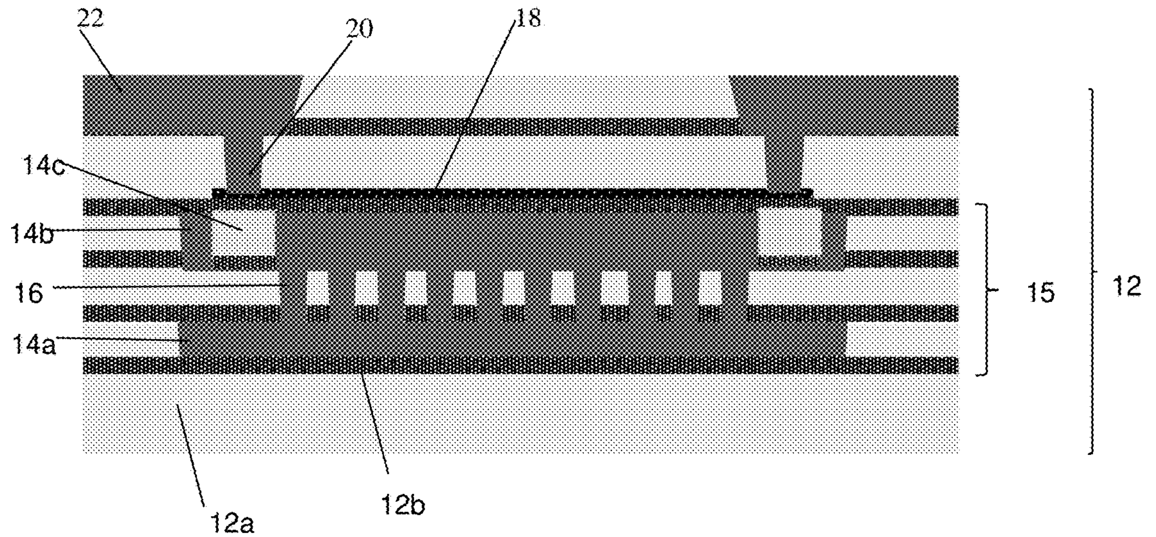
FIG. 1B shows a cross-section view of the heat dissipating structure of FIG. 1A, amongst other features, in accordance with aspects of the present disclosure.

FIG. 1A shows an exploded view of a heat dissipating structure and FIG. 1B shows a cross-sectional view of the heat dissipating structure in accordance with aspects of the present disclosure. More specifically, the structure 10 shown in FIGS. 1A and 1B includes a stack of interlevel dielectric materials 12 comprising alternating layers of insulator material 12*a*, 12*b*. In embodiments, the insulator material comprises alternating layers of oxide material 12*a* and nitride material 12*b*, in back end of the line structures.

As further shown in FIGS. 1A and 1B, a heat dissipating structure 15 may be provided underneath a thin film resistor 18. In embodiments, the thin film resistor 18 may be comprised of but not limited to, for example, SiCr, TaN, TaNO, SiCr(O), SiCr(O,N), SiCr(O,N,B), SiCrNi, NiCr, or other known materials. Also, in embodiments, SiCr materials may include, but not limited to, $Si_3Cr_5$ or SiCr or $Si_2Cr$ or $SiCr_3$, etc. In one illustrative example, the thin film resistor 18 may have a thickness of about 10 Å to 1000 Å, with a high resistivity, e.g., 1 K-ohm or greater. In further embodiments, the thin film resistor 18 may have a thickness that is equal to or less than the thickness of the insulator layer 12*b*.

The heat dissipating structure 15 comprises a plurality of heat dissipating plates 14*a*, 14*b* connected together by a plurality of heat dissipating via connections 16. In embodiments, the plurality of heat dissipating via connections 16 make direct contact with a bottom heat dissipating plate 14*a* and a top heat dissipating plate 14*b*. In this way, the plurality of heat dissipating plates 14*a*, 14*b* and the plurality of heat dissipating via connections 16 are a single structure acting as a heat sink to remove heat generated from the thin film resistor 18. In embodiments, the combination of the top heat dissipating plate 14*b* and the heat dissipating via connections 16 may be dual damascene or single damascene structures, as examples.

The bottom heat dissipating plate 14*a* and the top heat dissipating plate 14*b* may be solid metal plates provided within the layers 12*a*, 12*b* of the interlevel dielectric material 12. The top heat dissipating plate 14*b* may be separated from the thin film resistor 18 by insulator layer 12*b*, e.g., nitride material. Also, in embodiments, the top heat dissipating plate 14*b* may be at least the same size as the thin film resistor 18, e.g., equal to or larger footprint. The plurality of heat dissipating plates 14*a*, 14*b* and the plurality of heat dissipating via connections 16 may be comprised of heat dissipating materials, e.g., metal materials. For example, the plurality of heat dissipating plates 14*a*, 14*b* and the plurality of heat dissipating via connections 16 may be Cu, W or Al, or combinations thereof, amongst other heat dissipating materials.

Moreover, the top heat dissipating plate 14*b* may include a slot 14*c* aligned with via connections 20 connecting to the thin film resistor 18. In preferred embodiments, the thin film resistor 18 may be positioned between the slots 14*c*. The via connections 20 are used to bias the thin film resistor 18. For this to occur, the via connections 20 contact the thin film resistor 18 and upper wiring structures 22.

In embodiments, the slots 14*c* may be rectangular, square, oval, circular or other shape, filled with the interlevel dielectric material 12. In further embodiments, the slots 14*c* may be equal to or larger than the size of the via connections 20 to ensure that the via connections 20 do not contact or electrically short to the top heat dissipating plate 14*b*. For example, during an etching process in the interlevel dielectric material 12 to form vias, a punch though may occur resulting in exposure of the top heat dissipating plate 14*b*. This being the case, deposition of conductive material to form the via connections 20 may result in electrical contact between the top heat dissipating plate 14*b* and the via connections 20 resulting in an electrical short. However, due to the slotted configuration of the top heat dissipating plate 14*b*, even if punch through occurs during the fabrication processes, e.g., etching process, the via connections 20 would land on insulator material and the top heat dissipating plate 14*b* will remain isolated from the via connections 20, hence preventing electrical shorting.

Figure 2A:
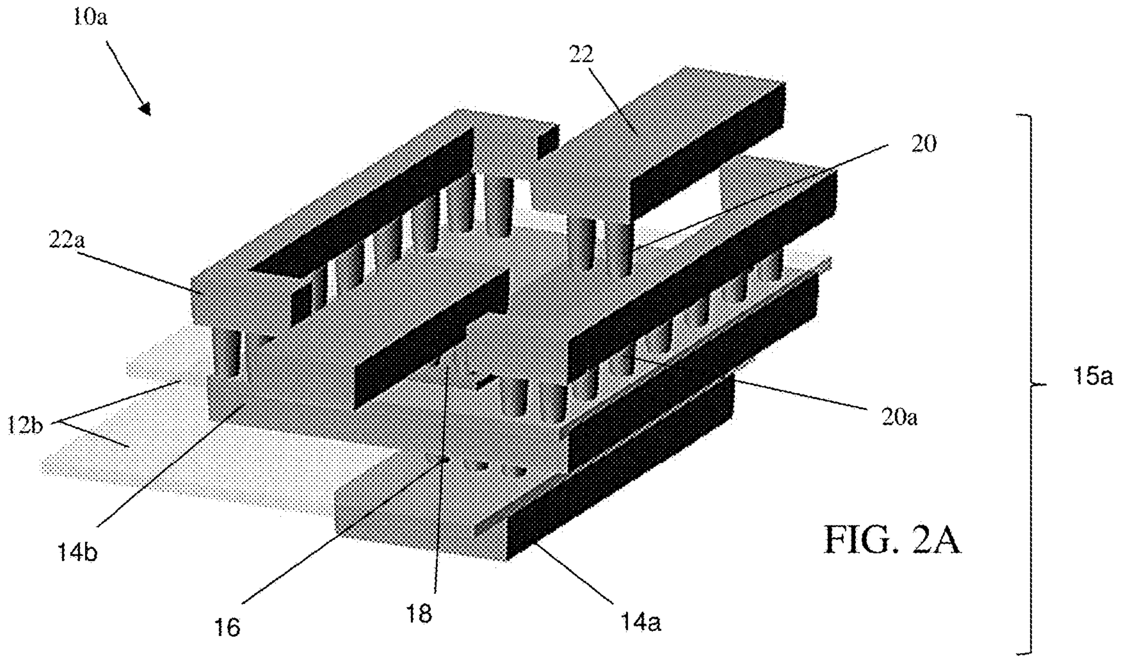
FIG. 2A shows an exploded 3-dimensional view of a heat dissipating structure, amongst other features, in accordance with additional aspects of the present disclosure.
Figure 2B:
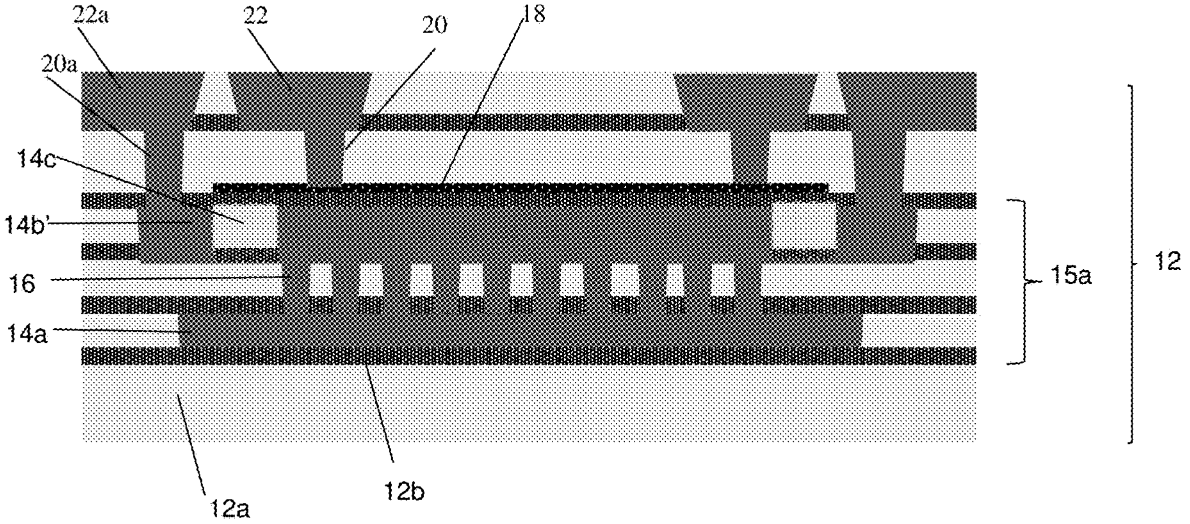
FIG. 2B shows a cross-section view of the heat dissipating structure of FIG. 2A, amongst other features, in accordance with additional aspects of the present disclosure.

FIG. 2A shows an exploded view of an alternative configuration of the heat dissipating structure and FIG. 2B shows a cross-sectional view of the heat dissipating structure in accordance with aspects of the present disclosure. More specifically, the structure 10*a* shown in FIGS. 2A and 2B includes a heat dissipating structure 15*a* underneath the thin film resistor 18, with the top heat dissipating plate 14*b*' extending beyond or past the via connections 20 and upper wiring structures 22. In this way, it is possible to provide via connections 20*a* (e.g., via) directly to the top heat dissipating plate 14*b*' with wiring structures 22*a* connecting to the via connections 20*a* on the same level or a different level than the wiring structures 22. In embodiments, the wiring structures 22*a* and via connections 20*a* may also provide additional metal to assist in heat dissipation from the thin film resistor 18. In addition, the wiring structures 22*a* and the via connections 20*a* may be used to provide a back bias to the heat dissipating structure 15*a*. The remaining features are the same as described with respect to FIGS. 1A and 1B.

Figure 3A:
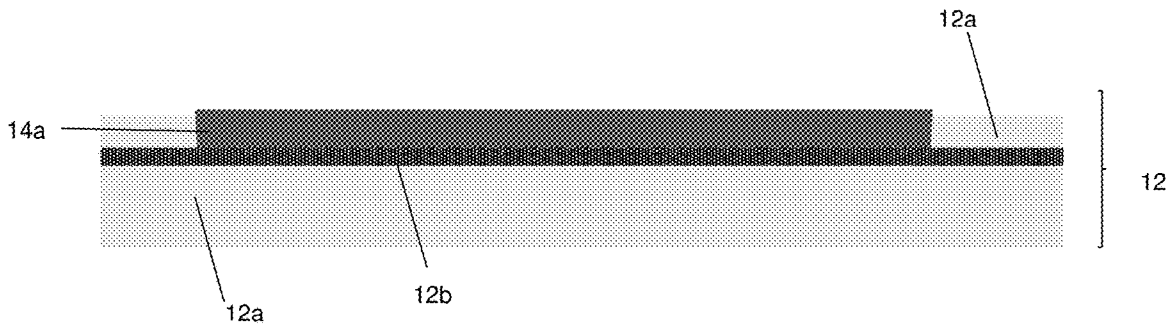
FIGS. 3A-3E show various fabrication steps and respective structure for manufacturing the heat dissipating structure shown in FIGS. 1A and 1B.

FIGS. 3A-3E show various fabrication processes and respective structures for manufacturing the structure 10 of FIGS. 1A-1B. These same or similar fabrication steps may be used for manufacturing the structure 10*a* of FIGS. 2A-2B. In particular, FIG. 3A shows interlevel dielectric material 12 with the bottom heat dissipating plate 14*a* embedded with the upper insulator layer 12*a*. In embodiments, the interlevel dielectric material 12 may be formed by deposition of different insulator layers 12*a*, 12*b*, e.g., oxide and nitride, in sequence. The deposition process may be, e.g., chemical vapor deposition (CVD) process.

The bottom heat dissipating plate 14*a* may be formed in insulator layer 12*a* (oxide) of the interlevel dielectric material 12 using conventional lithography, etching and deposition methods known to those of skill in the art. For example, a resist formed over the insulator layer 12*a* is exposed to energy (light) to form a pattern (opening). An etching process with a selective chemistry, e.g., reactive ion etching (RIE), will be used to transfer the pattern from the patterned photoresist layer into the insulator layer 12*a* to form a trench in the insulator layer 12*a*. Following the resist removal by a conventional oxygen ashing process or other known stripants, conductive material can be deposited by any conventional deposition processes, e.g., chemical vapor deposition (CVD), physical vapor deposition (PVD), or electrochemical plating (ECP) processes, to form the bottom heat dissipating plate 14*a*. Any residual conductive material on the surface of the insulator layer 12*a* may be removed by conventional chemical mechanical polishing (CMP) processes.

Figure 3B:
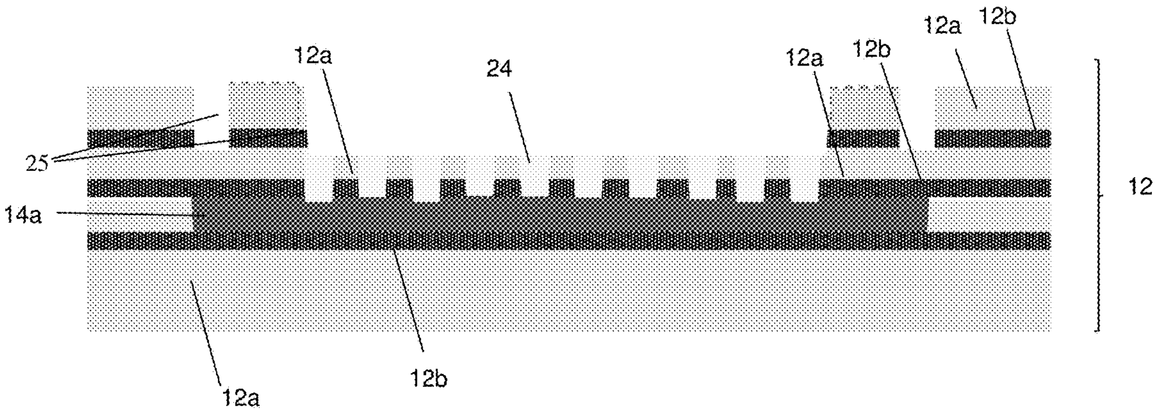

In FIG. 3B, additional insulator layers 12*b*, 12*a*, 12*b*, 12*a* may be deposited over the bottom heat dissipating plate 14*a*. In embodiments, the additional insulator layers 12*b*, 12*a*, 12*b*, 12*a* may be sequentially deposited using CVD processes. Using a conventional dual damascene process (or two single damascene processes), a plurality of vias 24 may be formed in the lower insulator layers 12*b*, 12*a* to expose an upper surface of the bottom heat dissipating plate 14*a*. A trench 25 may be formed over the plurality of vias 24, extending through the upper insulator layers 12*b*, 12*a*. As should be understood by those of skill in the art, the patterning of the trench 25 in the insulator layers 12*b*, 12*a* will result in the formation of the slot 14*c* as shown in FIG. 3C.

Figure 3C:
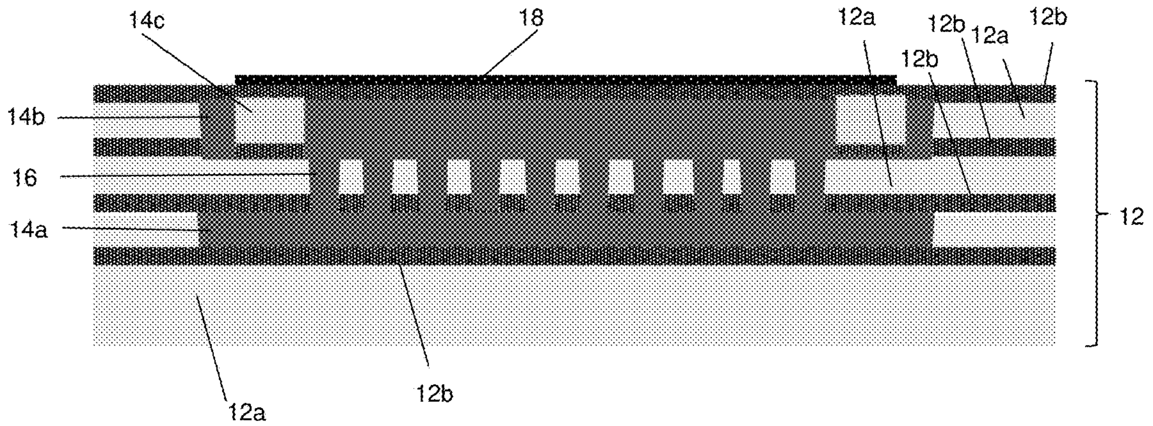

In FIG. 3C, conductive material may be deposited within the plurality of vias 24 and the trench 25. In this way, the conductive material will form the heat dissipating via connections 16 in contact with the bottom heat dissipating plate 14*a* and the top heat dissipating plate 14*b* in contact with the heat dissipating via connections 16. A chemical mechanical planarization (CMP) process may be used to planarize an upper surface of the top heat dissipating plate 14*b*.

FIG. 3C further shows an insulating layer 12*b* deposited over the top heat dissipating plate 14*b*, followed by the formation of the thin film resistor 18. The thin film resistor 18 may be formed by a deposition of the material used for the thin film resistor 18, followed by a conventional patterning process using lithography and etching processes as already described herein.

Figure 3D:
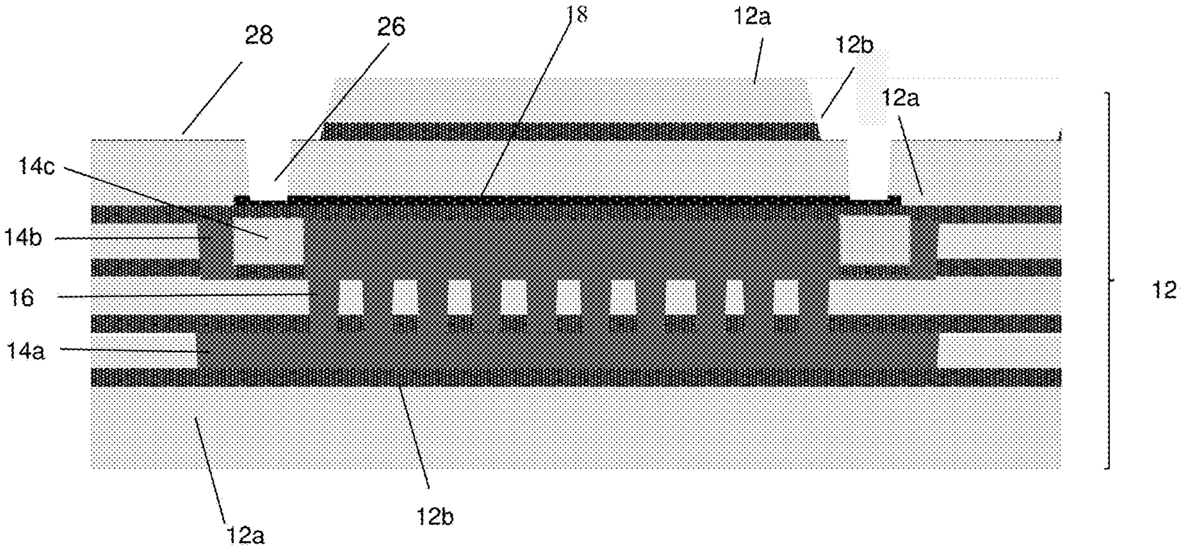

In FIG. 3D, additional insulator layers 12*a*, 12*b*, 12*a* may be sequentially deposited over the thin film resistor 18. As with the other insulator layers, the additional insulator layers 12*a*, 12*b*, 12*a* made be sequentially deposited by a CVD process. Using a conventional dual damascene process (or two single damascene processes), a plurality of vias 26 and trenches 28 may be formed in the additional insulator layers 12*a*, 12*b*, 12*a* to expose an upper surface of the thin film resistor 18.

Figure 3E:
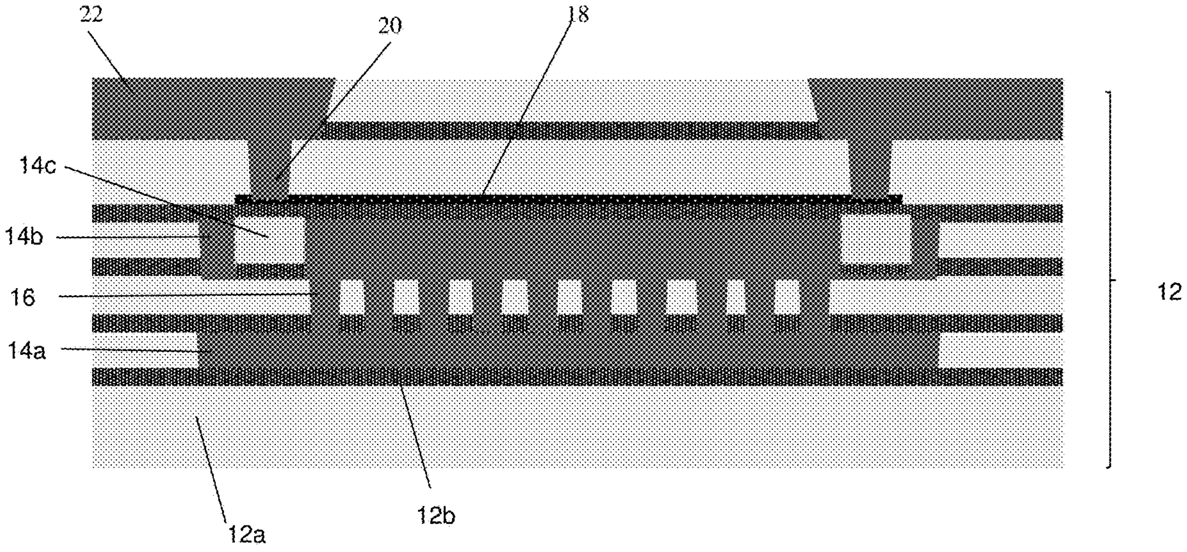

As shown in FIG. 3E, the plurality of vias 26 and trenches 28 may be filled with conductive material to form the via connections 20 and the wiring structures 22. In this way, the conductive material will form the via connections 20 in contact with the thin film resistor 18. A chemical mechanical planarization (CMP) process may be used to planarize an upper surface of the top heat dissipating plate 14*b*.

The heat dissipating structures can be utilized in system on chip (SoC) technology. The SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:

a thin film resistor within a back end of a line structure; and a heat dissipating structure below the thin film resistor comprising a top plate with a slotted configuration, and within the back end of the line structure, and a solid bottommost plate disposed within an insulator material of the back end of the line structure, wherein the top plate with the slotted configuration comprises slots filled with the insulator material and is connected to an upper wiring structure from a top side by via connections on a side extending beyond an end of the thin film resistor, and wherein the top plate extends beyond a footprint of the thin film resistor, and via connections extend to and contact the top plate beyond the footprint of the thin film resistor, and the via connections are provided on a side of the slotted configuration of the top plate and the thin film resistor is on another side of the slotted configuration and the solid bottommost plate extends beyond the slotted configuration.

2. The structure of claim 1, wherein the back end of the line structure comprises alternating layers of insulator material, with at least one of the alternating layers of insulator material separating the thin film resistor from the heat dissipating structure.

3. The structure of claim 1, wherein the top plate comprises a footprint that is larger than the thin film resistor.

4. The structure of claim 1, further comprising a plurality of via connections connecting to the thin film resistor, the via connections being aligned with the slots of the slotted configuration of the top plate.

5. The structure of claim 4, wherein the slots of the top plate are larger than the plurality of via connections.

6. The structure of claim 1, wherein the heat dissipating structure further comprises additional via connections extending from a bottom side of the top plate and extending to a topside of the solid bottommost plate.

7. The structure of claim 6, wherein the solid bottommost plate directly contacts the additional via connections on the topside of the solid bottommost plate.

8. A structure comprising:

a thin film resistor within insulator material;

a top heat dissipating plate is separated from the thin film resistor by the insulator material;

a plurality of heat dissipating via connections contacting the heat dissipating plate from a bottom surface, the plurality of heat dissipating via connections being in the insulator material; and a solid bottom heat dissipating plate is embedded within insulator material and on top of dielectric material, the solid bottom heat dissipating plate being connected to the top heat dissipating plate by the plurality of heat dissipating via connections, wherein the top heat dissipating plate comprises slots filled with the insulator material and is connected to an upper wiring structure from a top side by via connections on a side extending beyond an end of the thin film resistor.

9. The structure of claim 8, wherein the top heat dissipating plate comprises a footprint that is equal to or larger than the thin film resistor.

10. The structure of claim 8, wherein the solid bottom heat dissipating plate is connected to the plurality of heat dissipating via connections such that the plurality of heat dissipating via connections, the bottom heat dissipating plate and the heat dissipating plate comprise a single structure.

11. The structure of claim 8, wherein the slots are aligned with via connections to the thin film resistor.

12. The structure of claim 8, wherein the top heat dissipating plate extends beyond a footprint of the thin film resistor.

13. The structure of claim 12, further comprising via connections contacting the top heat dissipating plate beyond the footprint of the thin film resistor.

14. The structure of claim 13, wherein the via connections connect to the top heat dissipating plate on a side of slots.

15. The structure of claim 14, wherein the thin film resistor is positioned between the slots.

16. A method comprising:

forming a thin film resistor within a back end of a line structure; and forming a heat dissipating structure below the thin film resistor comprising a top plate with a slotted configuration, and within the back end of the line structure, and a solid bottommost plate disposed on an insulator material of the back end of the line structure, wherein the top plate with the slotted configuration is filled with insulator material and is connected to an upper wiring structure from a top side by via connections on a side extending beyond an end of the thin film resistor, and wherein the top plate extends beyond a footprint of the thin film resistor, and via connections extend to and contact the top plate beyond the footprint of the thin film resistor, and the via connections are provided on a side of the slotted configuration of the top plate and the thin film resistor is on another side of the slotted configuration and the solid bottommost plate extends beyond the slotted configuration.

17. The structure of claim 8, wherein via connections extend to and contact the top plate beyond the footprint of the thin film resistor, and the via connections are provided on a side of the slotted configuration of the top plate.

18. The structure of claim 17, wherein the thin film resistor is on another side of the slotted configuration and the solid bottommost plate extends beyond the slotted configuration.

19. The structure of claim 17, wherein the top plate extends beyond a footprint of the thin film resistor.

* * * * *